(12) United States Patent
Jang et al.

(10) Patent No.: US 11,938,827 B2
(45) Date of Patent: Mar. 26, 2024

(54) SYSTEM FOR CONTROLLING MOTOR OF VEHICLE

(71) Applicants: HYUNDAI MOTOR COMPANY, Seoul (KR); KIA CORPORATION, Seoul (KR)

(72) Inventors: Ho Sun Jang, Chungcheongnam-do (KR); Han Hee Park, Hwaseong-si (KR); Seong Min Kim, Changwon-si (KR); Ho Rim Choi, Hwaseong-si (KR); Seon Mi Lee, Anyang-si (KR); Tae Il Yoo, Seongnam-si (KR); Seung Hyeon Bin, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 27 days.

(21) Appl. No.: 17/863,763

(22) Filed: Jul. 13, 2022

(65) Prior Publication Data
US 2023/0017062 A1 Jan. 19, 2023

(30) Foreign Application Priority Data
Jul. 13, 2021 (KR) .................. 10-2021-0091519

(51) Int. Cl.
*H02P 21/00* (2016.01)
*B60L 15/02* (2006.01)
*B60L 15/20* (2006.01)
*B60L 50/51* (2019.01)
*H02P 29/00* (2016.01)

(52) U.S. Cl.
CPC ............. *B60L 15/20* (2013.01); *B60L 15/025* (2013.01); *B60L 50/51* (2019.02); *H02P 21/00* (2013.01); *B60L 2240/427* (2013.01); *B60L 2240/547* (2013.01); *H02P 29/00* (2013.01)

(58) Field of Classification Search
CPC ........ B60L 15/20; B60L 50/51; B60L 15/025; B60L 2240/427; H02P 29/00; H02P 21/00; H02P 27/14; H02P 27/06
See application file for complete search history.

(56) References Cited

U.S. PATENT DOCUMENTS 11,754,434 B1 * 9/2023 Hwang .................. G07C 5/08
702/175

FOREIGN PATENT DOCUMENTS

| CN | 104723900 A | * | 6/2015 | ............... B60K 1/00 |
|---|---|---|---|---|
| KR | 100804429 B1 | * | 2/2008 | |
| KR | 10-1827000 B1 | | 2/2018 | |
| KR | 10-1856301 B1 | | 5/2018 | |

* cited by examiner

*Primary Examiner* — Karen Masih
(74) *Attorney, Agent, or Firm* — Morgan, Lewis & Bockius LLP

(57) ABSTRACT

The present disclosure relates to a system for controlling a motor of a vehicle for increasing control accuracy of the motor for driving the vehicle, and an object of the present disclosure is to provide a system for controlling a motor of a vehicle, which may accurately perform a motor control even when a battery voltage (i.e., motor voltage) applied to the motor upon the driving control of the motor is changed.

2 Claims, 3 Drawing Sheets

-RELATED ART-

SYSTEM FOR CONTROLLING MOTOR OF VEHICLE

CROSS-REFERENCE TO RELATED APPLICATION

This application claims the benefit of priority to Korean Patent Application No. 10-2021-0091519 filed on Jul. 13, 2021 in the Korean Intellectual Property Office, the entire contents of which are incorporated herein by reference.

TECHNICAL FIELD

The present disclosure relates to a system for controlling a motor of a vehicle, and specifically, to a system for controlling a motor of a vehicle configured to increase the control accuracy of a motor for driving a vehicle.

BACKGROUND

Eco-friendly vehicles, such as an electric vehicle and a hybrid electric vehicle, use a motor as a driving source configured to generate a traveling driving force.

A main issue of the electric vehicle is to secure a charging time of a battery configured to supply power to a motor, which is a driving source, and a distance to empty when the battery is charged once.

To increase the distance to empty, the electric vehicle uses a method of a coast down mode for measuring a friction resistance, a rolling resistance, and an aerodynamic resistance, which are types of traveling resistance of the vehicle.

The coast down mode is a mode in which the vehicle travels only by inertia caused by a driving speed without acceleration or deceleration of the vehicle by increasing a vehicle speed to a certain level (e.g., about 120 kph) and then changing a shifting gear into a neutral stage (N stage), and also referred to as a coasting mode.

The electric vehicle measures the traveling resistance of the vehicle in the coast down mode when measuring the traveling resistance, and performs a zero torque control of a motor for traveling only by the inertia.

However, when the motor for driving the vehicle may not accurately output the zero torque, a value of the traveling resistance measured in the coast down mode may not be reliable either. Therefore, there is a need for an accurate control for the motor in order to improve reliability for a fuel efficiency evaluation of the vehicle.

Meanwhile, a system for controlling a motor for the electric vehicle generally controls the motor by a current instruction transmitted to an inverter.

Conventionally, when the current instruction transmitted to the inverter is generated, a torque instruction generated based on a motor speed has been used. If the torque instruction is generated based on the motor speed, convenience is secured in terms of the motor control but there is a disadvantage in that the influence according to the fluctuation of the battery voltage is not reflected to the motor control.

Recently, as the battery used as the motor power source of the electric vehicle is increased from a 400 V level to an 800 V level, the fluctuation of a direct current voltage of the battery according to a state of charge (SOC) largely occurs.

Therefore, when the motor is controlled using the torque instruction generated based on the motor speed, the influence according to the fluctuation of the voltage of the battery may not be reflected to the motor control, thereby eventually lowering motor controllability and causing a deviation in an output torque of the motor.

The above information disclosed in this Background section is only for enhancement of understanding of the background of the disclosure and accordingly it may include information that does not form the prior art that is already known in this country to a person of ordinary skill in the art.

SUMMARY OF THE DISCLOSURE

The present disclosure has been made in an effort to solve the above problem associated with the related art, and an object of the present disclosure is to provide a system for controlling a motor of a vehicle, which may accurately perform a motor control even when a battery voltage (i.e., motor voltage) applied to the motor upon driving control of the motor is changed.

The object of the present disclosure is not limited to the aforementioned object, and other objects of the present disclosure not mentioned may be understood by the following description, and known by an exemplary embodiment of the present disclosure more accurately. Further, the object of the present disclosure may be achieved by the means described in the claims and a combination thereof.

A system for controlling a motor for driving a vehicle for achieving the object of the present disclosure includes the following configuration.

A system for controlling a motor of a vehicle according to the present disclosure includes a magnetic flux estimation module configured to determine a reverse magnetic flux based on a motor speed and a motor voltage; a torque instruction generation module configured to determine a torque instruction based on the reverse magnetic flux determined by the magnetic flux estimation module and a motor torque output by the motor; and an inverter configured to control driving of the motor based on the torque instruction.

According to an exemplary embodiment of the present disclosure, the magnetic flux estimation module receives the motor speed from a speed calculation module, and the speed calculation module comprises a motor position sensor configured to detect a position of a rotor of the motor and a differentiator configured to determine the motor speed based on the position of the rotor detected by the motor position sensor.

Further, the system for controlling the motor further includes a current instruction generation module configured to generate a current instruction based on a torque instruction received from the torque instruction generation module and the reverse magnetic flux received from the magnetic flux estimation module; a current control module configured to generate a terminal voltage instruction based on the current instruction received from the current instruction generation module, the motor speed received from the speed calculation module, and a biaxial current received from a coordinate conversion module; and a voltage instruction modulation module configured to generate a modulation voltage instruction based on the terminal voltage instruction received from the current control module, in which the inverter determines and controls a three-phase current for driving the motor based on the modulation voltage instruction.

Further, the system for controlling the motor further includes the coordinate conversion module that is configured to generate the biaxial current based on the three-phase current applied to the motor by the inverter and the position of the rotor of the motor detected by the motor position sensor.

According to the above configuration, the system for controlling the motor according to the present disclosure provides the following effects.

First, it is possible to accurately perform the motor control even when the battery voltage (i.e., motor voltage) applied to the motor upon driving control of the motor is changed, thereby reducing the deviation in the motor torque caused by the fluctuation of the motor voltage.

Second, it is possible to reduce the deviation in the motor torque caused by the change in the motor voltage even when the zero torque control of the motor is performed using the high-voltage power of the 800 V level as the accuracy of the motor control is increased, and to eventually improve reliability of the fuel efficiency evaluation of the vehicle by reducing the deviation.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
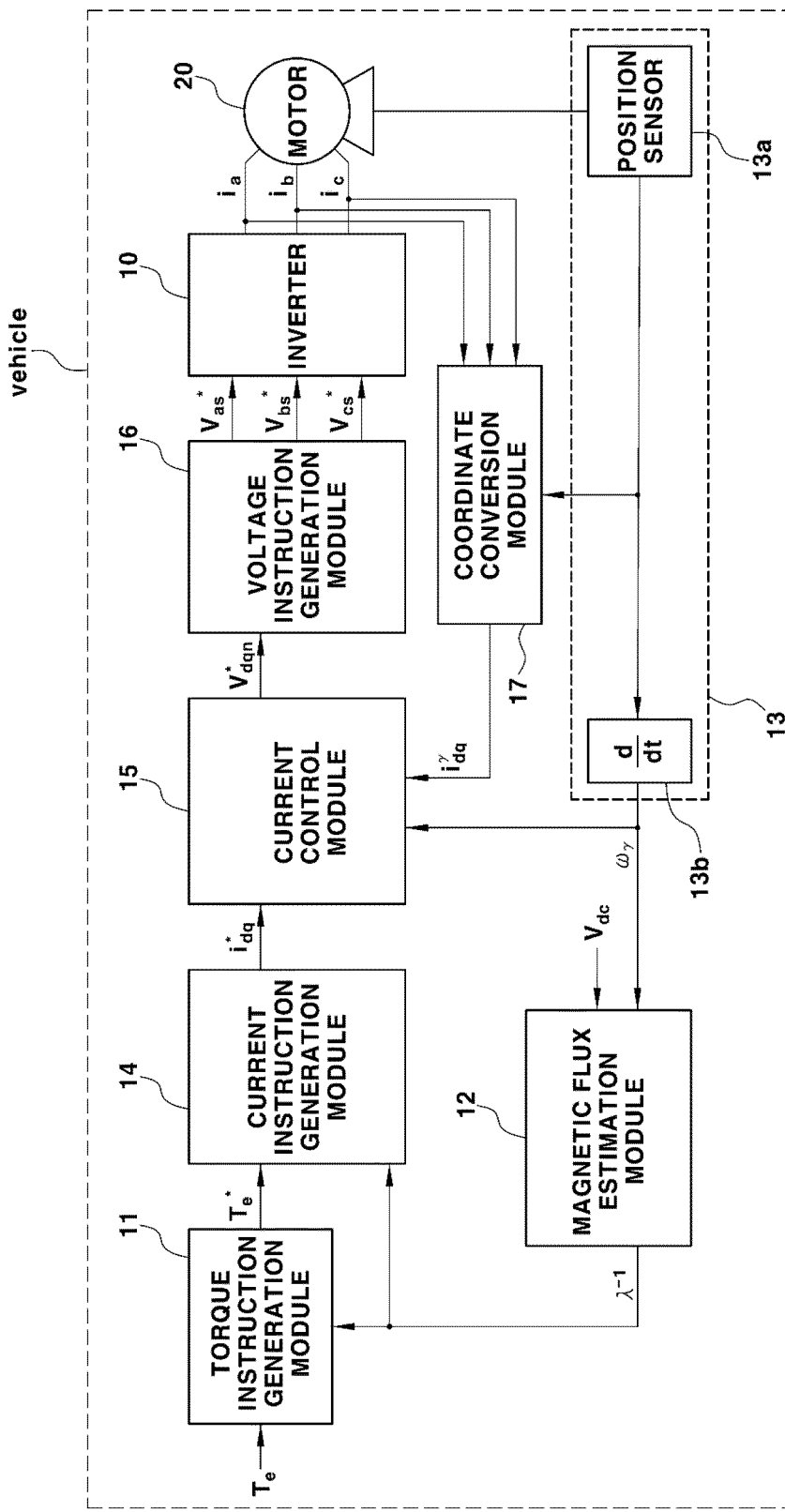
FIG. 1 illustrates a system for controlling a motor of a vehicle according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, an exemplary embodiment of the present disclosure will be described with reference to the accompanying drawings. Components illustrated in the accompanying drawings are illustrated for easily explaining the exemplary embodiment of the present disclosure and may be different from forms actually implemented.

Throughout the present specification, when a certain portion "comprises" a certain component, this means that other components may be further included rather than excluding other components unless otherwise stated specially.

For helping to understand the present disclosure, first, a conventional method for controlling the motor will be briefly described.

A system for controlling a motor of an electric vehicle generally controls a motor by a current instruction transmitted to an inverter.

Conventionally, when the current instruction transmitted to the inverter is generated, a torque instruction generated based on a motor speed has been used. When the torque instruction is generated based on the motor speed, convenience is secured in terms of the motor control but there is a disadvantage in that the influence according to the fluctuation of a battery voltage is not reflected to the motor control.

In case of an interior permanent magnet synchronous motor (IPMSM) used as a motor for driving an electric vehicle, errors in a magnetic flux, a torque, and a voltage are caused by the influence of a cross coupling inductance having nonlinearity. Therefore, a battery voltage applied to the motor upon the motor control should be considered.

Further, as the battery used as the motor power source of the electric vehicle is increased from a 400 V level to an 800 V level, the fluctuation of a direct current voltage of the battery according to a state of charge (SOC) largely occurs. As the fluctuation of the battery voltage is increased, the influence of the battery voltage on the motor control is increased.

Therefore, when the motor is controlled using the torque instruction generated based on the motor speed, the influence according to the fluctuation of the battery voltage may not be reflected to the motor control, thereby eventually lowering motor controllability and causing a deviation in an output torque of the motor.

Further, even upon the zero torque control of the motor, the deviation in the torque is caused by the fluctuation of the battery voltage, thereby eventually lowering reliability for the fuel efficiency evaluation of the vehicle.

Therefore, according to the present disclosure, it is possible to reduce the deviation in the torque caused by the fluctuation of the battery voltage upon the motor control in case of using the battery of the 800 V level as well as in case of using the battery of the 400 V level, thereby controlling the motor more accurately.

FIG. 1 illustrates a system for controlling a motor of a vehicle according to an exemplary embodiment of the present disclosure.

A system for controlling a motor according to the present disclosure is a system for controlling a motor 20 for driving a vehicle using an inverter 10, in which as the motor 20, an interior permanent magnet synchronous motor (IPMSM) is mainly used.

As illustrated in FIG. 1, the system for controlling the motor is configured to include a torque instruction generation module 11 configured to generate a torque instruction ($T_e^*$), and an inverter 10 configured to control driving of the motor 20 based on the torque instruction ($T_e^*$).

The torque instruction generation module 11 of the system is configured to determine the torque instruction ($T_e^*$) based on a reverse magnetic flux ($\lambda^{-1}$) and a torque ($T_e$) of the motor. In other words, the torque instruction generation module 11 is configured to generate the torque instruction ($T_e^*$) based on the reverse magnetic flux ($\lambda^{-1}$) and the motor torque ($T_e$), which are input in real time.

More specifically, the torque instruction generation module 11 may generate the torque instruction ($T_e^*$) by converting the motor torque ($T_e$), which is input in real time, based on the reverse magnetic flux ($\lambda^{-1}$).

The motor torque ($T_e$) is a value of a real-time output torque output by the motor 20, and the reverse magnetic flux ($\lambda^{-1}$) is a value of a real-time reverse magnetic flux generated when the motor 20 is driven.

The reverse magnetic flux ($\lambda^{-1}$) may be calculated based on a motor speed ($\omega_r$) and a motor voltage ($V_{dc}$) as shown in Equation 1 below.

$$\lambda^{-1} = \frac{\omega_r}{\frac{V_{dc}}{\sqrt{3}}} \times 2 \times \pi \times p.p. \times \frac{1}{60} \qquad \text{Equation 1}$$

The motor voltage ($V_{dc}$) is a direct current voltage applied to the motor 20 from a battery (not illustrated), which is a direct current power supply of the vehicle, and the motor speed ($\omega_r$) is a rotation speed of the motor 20. The motor voltage ($V_{dc}$) is an output voltage of the battery and an input voltage of the inverter 10. Further, the p.p. is the number of permanent magnets provided in the motor 20 or the number of pairs of poles of the motor 20. The inverter 10 converts the direct current power supplied from the battery into the alternate current power for driving the motor to deliver the alternate current power to the motor 20.

Referring to Equation 1, the torque instruction generation module 11 determines the torque instruction ($T_e^*$) based on the reverse magnetic flux ($\lambda^{-1}$) proportional to the motor speed (ωr), thereby eventually generating the torque instruction ($T_e^*$) which reflects the motor voltage ($V_{dc}$).

Therefore, the torque instruction generation module 11 generates the torque instruction ($T_e^*$) corresponding to the output torque required by the motor 20 in case of changing the motor voltage ($V_{dc}$) as well as in a case of changing the motor speed ($\omega_r$).

In other words, the torque instruction generation module 11 variably generates the torque instruction ($T_e^*$) according to the motor voltage ($V_{dc}$) as well as the motor torque ($T_e$) and the motor speed ($\omega_r$), thereby reflecting the effect of variably determining and applying a correction value of the motor torque ($T_e$) according to the motor voltage ($V_{dc}$) when generating the torque instruction ($T_e^*$).

More specifically, the torque instruction ($T_e^*$) is a torque instruction including the motor torque ($T_e$) output by the motor 20, which is being driven, in real time and a correction torque for correcting the motor torque ($T_e$). The torque instruction ($T_e^*$) may be used as a control variable which allows the motor 20 to output a torque obtained by summing the motor torque ($T_e$) and the correction torque. In other words, the torque instruction ($T_e^*$) may be used as the control variable which allows the motor 20 to output the torque corresponding to a required torque required by the vehicle.

The torque instruction generation module 11 may receive information on the motor torque ($T_e$) from a torque detection means (not illustrated) configured to detect the motor torque ($T_e$) in real time. Further, the torque instruction generation module 11 may receive information on the reverse magnetic flux ($\lambda^{-1}$) from the magnetic flux estimation module 12. Further, the torque instruction generation module 11 may be constructed in the form of a look-up table generally used.

The magnetic flux estimation module 12 of the system is configured to estimate and determine the value of the reverse magnetic flux ($\lambda^{-1}$) based on the motor speed ($\omega_r$) and the motor voltage ($V_{dc}$).

The magnetic flux estimation module 12 may receive information on the motor speed ($\omega_r$) from a speed calculation module 13. Further, the magnetic flux estimation module 12 may receive information on the motor voltage ($V_{dc}$) from a voltage detection means (not illustrated) configured to detect the motor voltage ($V_{dc}$) in real time.

The speed calculation module 13 configured to calculate the motor speed ($\omega_r$) input to the magnetic flux estimation module 12 may include a motor position sensor 13a and a differentiator 13b.

The motor position sensor 13a of the speed calculation module 13 is configured to detect a position of a rotor of the motor 20 in real time, and the differentiator 13b of the speed calculation module 13 is configured to receive information on the position of the rotor from the motor position sensor 13a to calculate the motor speed ($\omega_r$). In other words, the differentiator 13b is configured to operate and determine the motor speed ($\omega_r$) based on the information on the position of the rotor of the motor 20.

Meanwhile, the inverter 10 of the system determines and controls a driving current for controlling the driving of the motor 20 based on a modulation voltage instruction (i.e., three-phase voltage instruction) generated based on the torque instruction ($T_e^*$) of the torque instruction generation module 11.

Therefore, the system for controlling the motor according to the present disclosure may be configured to include a current instruction generation module 14, a current control module 15, and a voltage instruction modulation module 16 for generating the modulation voltage instruction based on the torque instruction ($T_e^*$).

The current instruction generation module 14 of the system is configured to determine a current instruction ($i_{dq}^*$) based on the torque instruction ($T_e^*$) received from the torque instruction generation module 11 and the reverse magnetic flux ($\lambda^{-1}$) received from the magnetic flux estimation module 12. In other words, the current instruction generation module 14 is configured to convert the torque instruction ($T_e^*$) based on the reverse magnetic flux ($\lambda^{-1}$) to generate the current instruction ($i_{dq}^*$). The current instruction ($i_{dq}^*$) determined by the current instruction generation module 14 is delivered to the current control module 15.

The current control module 15 of the system is configured to determine a terminal voltage instruction ($V_{dqn}^*$) based on the current instruction ($i_{dq}^*$) the motor speed ($\omega_r$), and a biaxial current ($i_{dq}^r$). The current control module 15 receives the current instruction ($i_{dq}^*$) from the current instruction generation module 14 and receives the motor speed ($\omega_r$) from the speed calculation module 13. Further, the current control module 15 receives the biaxial current ($i_{dq}^r$) from a coordinate conversion module 17 of the system.

The coordinate conversion module 17 of the system is configured to generate the biaxial current ($i_{dq}^r$) based on the driving current (i.e., three-phase current) applied to the motor 20 through the inverter 10 and the position of the rotor of the motor 20 detected by the motor position sensor 13a. More specifically, the coordinate conversion module 17 converts the three-phase current applied to the motor 20 by the inverter 10 based on the position of the rotor of the motor 20 detected by the motor position sensor 13a to generate the biaxial current ($i_{dq}^r$) and deliver the biaxial current ($i_{dq}^r$) to the current control module 15.

The terminal voltage instruction ($V_{dqn}^*$) output from the current control module 15 is delivered to the voltage instruction modulation module 16. The current control module 15 may also be referred to as a terminal voltage instruction generation module.

The voltage instruction modulation module 16 of the system is configured to determine the modulation voltage instruction for controlling the inverter 10 based on the terminal voltage instruction ($V_{dqn}^*$) received from the current control module 15. The voltage instruction modulation module 16 generates the modulation voltage instruction as an instruction corresponding to the driving current output to the motor 20 by the inverter 10 and a voltage instruction corresponding to the torque instruction ($T_e^*$) of the torque instruction generation module 11.

The voltage instruction modulation module 16 delivers the modulation voltage instruction to the inverter 10, thereby eventually determining and controlling the driving current of the motor 20.

Specifically, the voltage instruction modulation module 16 converts the terminal voltage instruction ($V_{dqn}^*$) by a pulse width modulation (PWM) control to generate the modulation voltage instruction. The modulation voltage instruction is configured by a combination of a first voltage instruction ($V_{as}^*$), a second voltage instruction ($V_{bs}^*$), and a third voltage instruction ($V_{cs}^*$). The first voltage instruction ($V_{as}^*$) is an instruction corresponding to a first current ($i_a$) among the three-phase current applied to the motor 20 through the inverter 10, the second voltage instruction ($V_{bs}^*$) is an instruction corresponding to a second current ($i_b$) among the three-phase current applied to the motor 20 by the inverter 10, and the third voltage instruction ($V_{cs}^*$) is an instruction corresponding to a third current ($i_c$) among the three-phase current applied to the motor 20 by the inverter 10.

The first voltage instruction ($V_{as}^*$), the second voltage instruction ($V_{bs}^*$), and the third voltage instruction ($V_{cs}^*$) have a phase difference of 120° from each other, and the voltage instruction modulation module 16 simultaneously delivers the first voltage instruction ($V_{as}^*$), the second voltage instruction ($V_{bs}^*$), and the third voltage instruction ($V_{cs}^*$) to the inverter 10.

The inverter 10 is configured to determine and control the driving current (i.e., three-phase current) supplied to the motor 20 based on the modulation voltage instruction received from the voltage instruction modulation module 16. In other words, the inverter 10 converts the direct current applied from the battery into the three-phase alternate current based on the modulation voltage instruction to deliver the three-phase alternate current to the motor 20.

The three-phase alternate current output from the inverter 10 to the motor 20 is composed of the first current ($i_a$), the second current ($i_b$), and the third current ($i_c$) having a phase difference of 120° from each other.

The inverter 10 applies the three-phase current to the motor 20 through a three-wire connected to the motor 20. The motor 20 receiving the three-phase current from the inverter 10 is driven to output the torque corresponding to the torque instruction ($T_e^*$) of the torque instruction generation module 11.

The system for controlling the motor according to the present disclosure configured as described above controls the motor 20 using the torque instruction ($T_e^*$) determined based on the reverse magnetic flux ($\lambda^{-1}$), and therefore, controls the driving current of the motor 20 using the motor voltage ($V_{dc}$) as well as the motor speed ($\omega_r$) as input variables.

Therefore, if the motor voltage ($V_{dc}$) is changed, the system for controlling the motor may determine the torque instruction ($T_e^*$) corresponding to the changed motor voltage ($V_{dc}$) and control the motor 20 based on the torque instruction ($T_e^*$) even if the motor torque ($T_e$) and the motor speed ($\omega_r$) are not changed, thereby increasing control accuracy.

The system for controlling the motor may achieve the motor control according to the motor voltage ($V_{dc}$) even when receiving the high-voltage power of the 800 V level to control the motor 20, thereby eventually reducing and minimizing the deviation in the motor torque according to the motor voltage ($V_{dc}$).

For example, the system for controlling the motor may reduce and minimize the deviation in the output torque of the motor 20 according to the motor voltage ($V_{dc}$) when performing the zero torque control of the motor 20 using the high-voltage power of the 800 V level, and eventually improve the reliability for the fuel efficiency evaluation of the vehicle by reducing the deviation.

Further, the torque instruction generation module 11, the current instruction generation module 14, the current control module 15, the voltage instruction modulation module 16, the magnetic flux estimation module 12, the differentiator 13b, the coordinate conversion module 17, and the inverter 10 constituting the system for controlling the motor according to the present disclosure may be composed of a software module operated by a preset program, composed of a hardware module composed of electronic elements, or composed of a combination module which combines the software module and the hardware module.

According to exemplary embodiments of the present disclosure, a processor has an associated non-transitory memory storing software instructions which, when executed by the processor, provides the functionalities of the torque instruction generation module 11, the current instruction generation module 14, the current control module 15, the voltage instruction modulation module 16, the magnetic flux estimation module 12, the differentiator 13b, and the coordinate conversion module 17. The processor may take the form of one or more processor(s) and associated memory storing program instructions to perform the respective functionalities of the torque instruction generation module 11, the current instruction generation module 14, the current control module 15, the voltage instruction modulation module 16, the magnetic flux estimation module 12, the differentiator 13b, and the coordinate conversion module 17.

Figure 2:
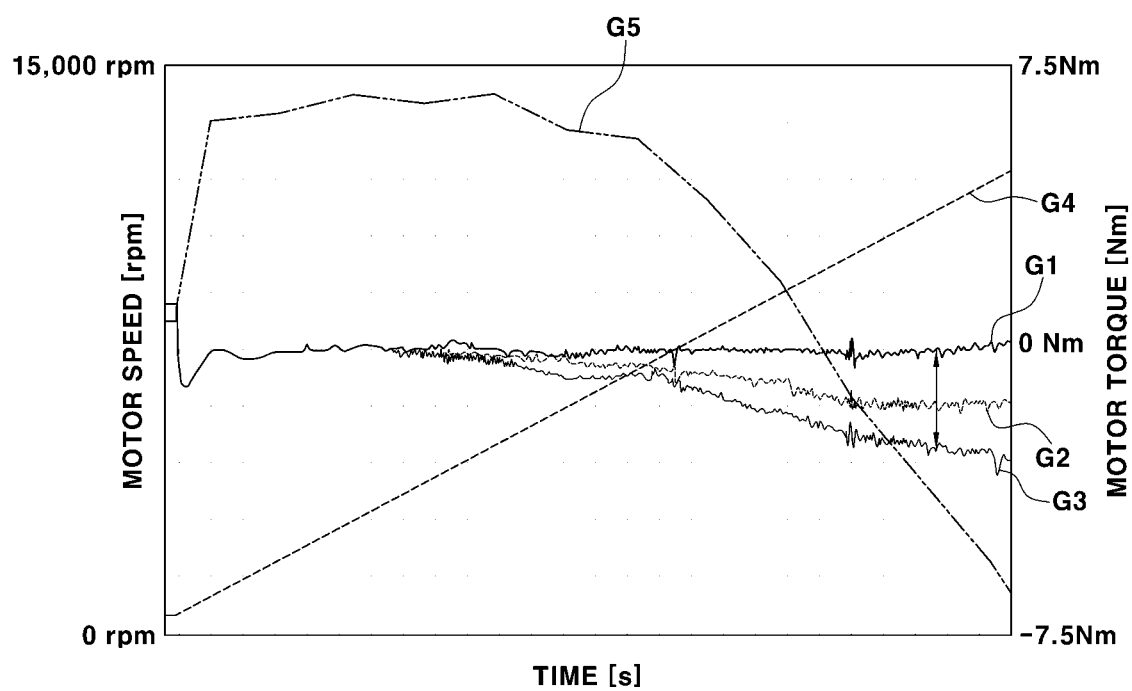
FIG. 2 is a graph illustrating a motor torque according to driving of a motor when a torque instruction is determined based on a motor speed according to the related art.
Figure 3:
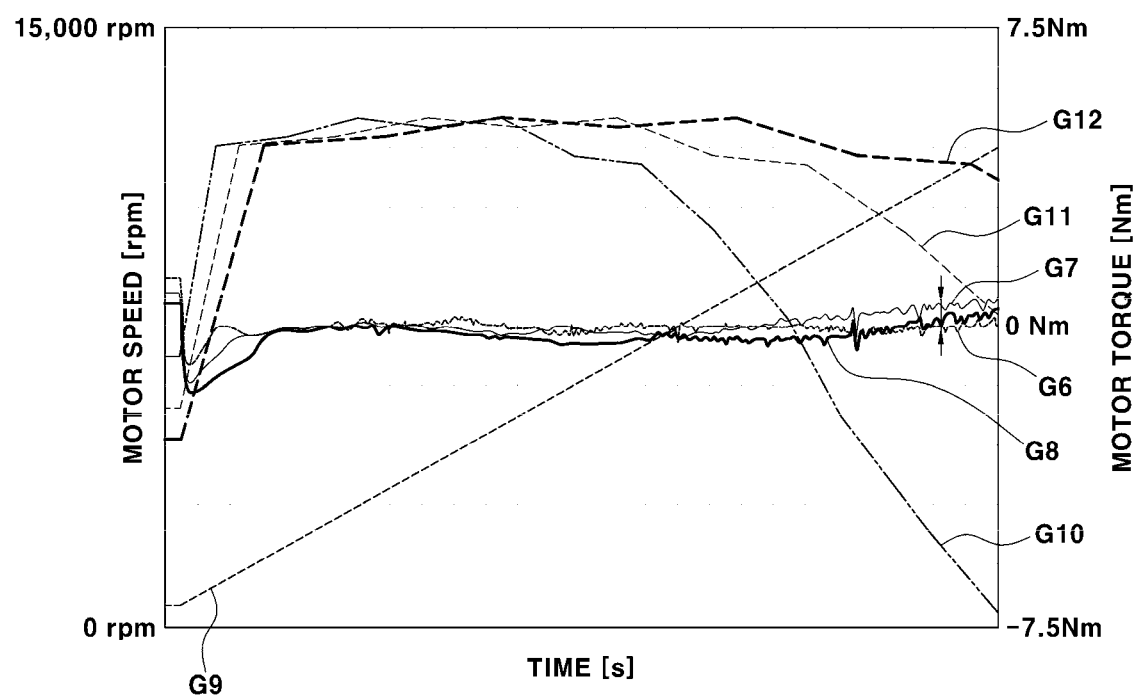
FIG. 3 is a graph illustrating a motor torque according to driving of a motor when a torque instruction is determined based on a reverse magnetic flux of the motor according to an exemplary embodiment of the present disclosure.

FIG. 2 is a graph illustrating a motor torque according to driving of a motor when a torque instruction is determined based on a motor speed according to the related art, and FIG. 3 is a graph illustrating a motor torque according to driving of a motor when a torque instruction is determined based on a reverse magnetic flux of the motor according to the present disclosure. FIGS. 2 and 3 illustrate the motor torque, the motor speed, and the torque correction value in case of receiving the power of the 800 V level to control the motor.

Here, the motor voltage means the direct current voltage of the battery configured to supply power to the motor for driving the electric vehicle and the input voltage of the inverter configured to convert the direct current power of the battery into the alternate current power to deliver the alternate current power to the motor.

Referring to FIG. 2, in case of controlling the motor using the torque instruction determined based on the motor speed according to the related art, it may be confirmed that as the motor speed increases, a deviation occurs in the output torque of the motor according to the motor voltage, and it may also be confirmed that the same torque correction value is applied even when the motor voltage is changed. In FIG. 2, G1 is a graph illustrating the motor torque according to the motor speed if the motor voltage is 450 V, G2 is a graph illustrating the motor torque according to the motor speed if the motor voltage is 600 V, G3 is a graph illustrating the motor torque according to the motor speed if the motor voltage is 750 V, G4 is a graph illustrating the motor speed over time, and G5 is a graph illustrating the torque correction value (i.e., correction torque) for correcting the motor torque according to the motor speed. At this time, the motor torques of G1 to G3 are torque values to which the torque correction values of G5 are reflected.

Referring to FIG. 2, it may be confirmed that as the motor speed increases, the deviation between the motor torque of G1, the motor torque of G2, and the motor torque of G3 increases, and it may be confirmed that when the motor speed is 11,000 rpm, the deviation of about −2.5 Nm occurs between the motor torque of G1 and the motor torque of G3.

Further, referring to FIG. 2, it may be confirmed that even when the motor voltage is changed (see G1, G2, and G3), the torque correction value of G5 is equally applied.

On the other hand, referring to FIG. 3, according to the present disclosure, when the motor is controlled using the torque instruction determined based on the reverse magnetic flux of the motor, the deviation occurs in the output torque of the motor according to the motor voltage but it may be confirmed that even if the motor speed increases, the deviation between the output torques of the motor according to the motor voltage is largely reduced compared to in FIG. 2.

In FIG. 3, G6 is a graph illustrating the motor torque according to the motor speed if the motor voltage is 450 V, G7 is a graph illustrating the motor torque according to the motor speed if the motor voltage is 600 V, G8 is a graph illustrating the motor torque according to the motor speed if the motor voltage is 750 V, G9 is a graph illustrating the motor speed over time, and G10 to G12 are graphs illustrating the torque correction values (i.e., correction torques) for correcting the motor torque according to the motor speed. In other words, G10 illustrates the correction torque for correcting the motor torque of G6, G11 illustrates the correction torque for correcting the motor torque of G7, and G12 illustrates the correction torque for correcting the motor torque of G8. At this time, the motor torques of G6 to G8 are torque values to which each of the torque correction values of G10 to G12 is reflected. Referring to FIG. 3, the deviation between the motor torque of G6, the motor torque of G7, and the motor torque of G8 exists, but it may be confirmed that when the motor speed is 11,000 rpm, the small deviation of about 0.45 Nm exists between the motor torque of G6 and the motor torque of G7, and the deviation smaller than 0.45 Nm exists between the motor torque of G6 and the motor torque of G8. As described above, the deviation of the motor torque is reduced because the torque correction value is changed and applied according to the motor voltage upon the motor control.

Further, referring to FIG. 3, it may be confirmed that if the motor voltage is changed (see G6, G7, and G8), different torque correction values are applied. It may be confirmed that the torque correction value determined according to G10 is used if the motor voltage is 450 V, the torque correction value determined according to G11 is used if the motor voltage is 600 V, and the torque correction value determined according to G12 is used if the motor voltage is 750 V.

While the exemplary embodiment of the present disclosure has been specifically described above, the terms or words used in the present specification and the claims should not be interpreted as being limited to conventional or dictionary meanings, and further, the scope of the present disclosure is not limited to the aforementioned exemplary embodiment and various modifications and improvements by those skilled in the art using the basic concept of the present disclosure defined in the appended claims are also included in the scope of the present disclosure.

What is claimed is:

1. A system for controlling a motor for driving a vehicle, comprising:
   a magnetic flux estimation module configured to determine a reverse magnetic flux based on a motor speed and a motor voltage;
   a torque instruction generation module configured to determine a torque instruction based on the reverse magnetic flux determined by the magnetic flux estimation module and a motor torque output by the motor;
   an inverter configured to control driving of the motor based on the torque instructions;
   a current instruction generation module configured to generate a current instruction based on a torque instruction received from the torque instruction generation module and the reverse magnetic flux received from the magnetic flux estimation module;
   a current control module configured to generate a terminal voltage instruction based on the current instruction received from the current instruction generation module, the motor speed received from the speed calculation module, and a biaxial current received from a coordinate conversion module; and
   a voltage instruction modulation module configured to generate a modulation voltage instruction based on the terminal voltage instruction received from the current control module,
   wherein the magnetic flux estimation module receives the motor speed from a speed calculation module, and the speed calculation module comprises a motor position sensor configured to detect a position of a rotor of the motor and a differentiator configured to determine the motor speed based on the position of the rotor detected by the motor position sensor, and
   wherein the inverter determines and controls a three-phase current for driving the motor based on the modulation voltage instruction.

2. The system for controlling the motor of claim 1, further comprising
   the coordinate conversion module that is configured to generate the biaxial current based on the three-phase current applied to the motor by the inverter and the position of the rotor of the motor detected by the motor position sensor.

* * * * *